Jan. 22, 1974  L. PICCOLO ET AL  3,787,556
METHOD FOR PREPARING TITANIUM TETRACHLORIDE
Filed May 11, 1971
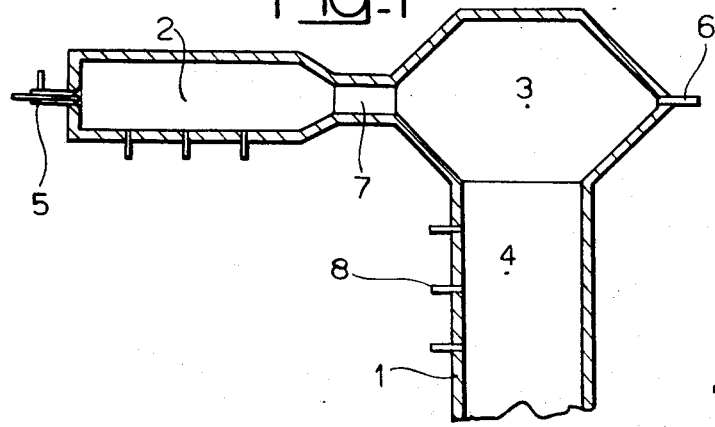
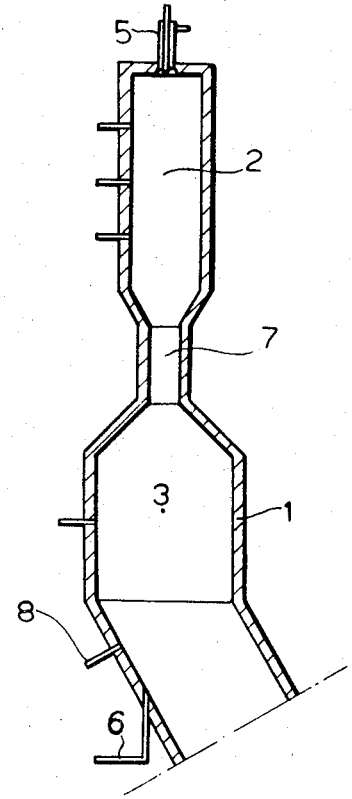
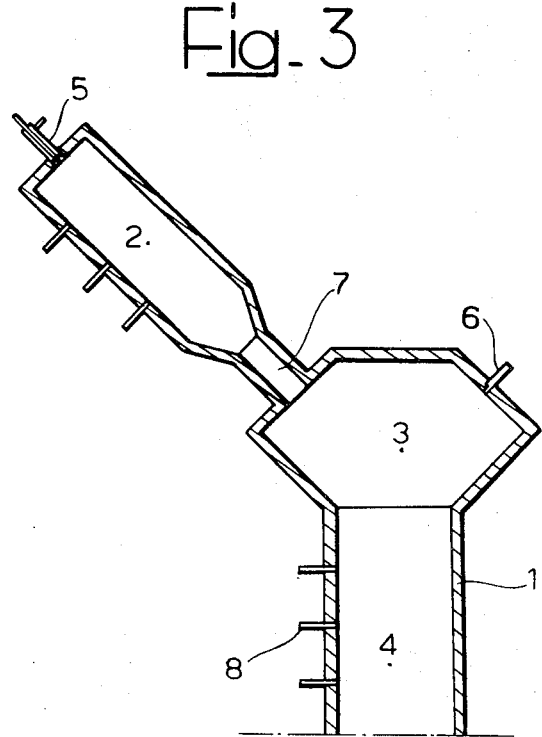

3,787,556
METHOD FOR PREPARING TITANIUM
TETRACHLORIDE
Luigi Piccolo and Benedetto Calcagno, Milan, and Marcello Ghirga, Bresso, Italy, assignors to Societa Italiana Resine S.p.A., Milan, Italy
Filed May 11, 1971, Ser. No. 142,326
Claims priority, application Italy, May 12, 1970, 24,458/70
Int. Cl. C01g 23/02
U.S. Cl. 423—77      8 Claims

ABSTRACT OF THE DISCLOSURE

Titanium tetrachloride is made by feeding powdered ilmenite or titanium slag to a reactor with reagent and heating gas streams of chlorine and the combustion products of coal.

---

The invention relates to a method for preparing titanium tetrachloride by chlorinating titanium ores by means of gaseous chlorine.

More particularly the invention relates to a method of and an apparatus for preparing high-grade titanium tetrachloride by chlorinating titanium ores having a relatively low titanium content.

The titanium tetrachloride produced is useful for preparing metallic titanium, or it may be converted into high-grade pigment titanium dioxide.

According to the methods known in the art the chlorine is fed to a chlorination reactor at the foot of a fluidized bed of solid particles, said particles comprising rutile ore and calcined petroleum coke. By operating at temperature of about 1,000° C., titanium tetrachloride is produced according to the equation:

$$TiO_2 + C + 2Cl_2 \rightarrow TiCl_4 + CO_2$$

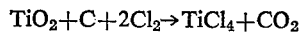

Only small amounts of by-products are obtained by this chlorination of rutile ore, said ore having a high titanium dioxide content (about 97% by weight). Said by-products essentially originate from the chlorination of oxides contained in the ore, such as for example the oxides of the elements iron, vanadium, chromium, magnesium, aluminium, silicon and zirconium.

The above described processes suffer from various disadvantages, since the rutile ore and petroleum coke are very expensive raw materials. Moreover the chlorination reaction requires a very close temperature control and inert oxides must be continuously withdrawn from the reaction zone.

Owing to the shortage of rutile ore, supply difficulties, localization of the ore deposits in a few areas of the world, and growth of plants for preparing titanium dioxide by means of the chlorination process, the necessity is raised of utilizing ilmenite or titanium slags as raw materials.

Such inexpensive materials are available in large quantities but various difficulties arise in chlorinating them according to the chlorination processes known in the art. For example in chlorinating ilmenite at about 1,000° C. by means of gaseous chlorine, the fluidized particles agglomerate in a short time, owing to the presence of molten ferrous chloride. Other metallic chlorides too, for example calcium or magnesium chloride, melt under such temperature conditions, and it follows that the fluidization is seriously compromised.

To obviate this difficulty it has been suggested to chlorinate the ilmenite at a temperature higher than 1,000° C., in order to convert the ferrous chloride into ferric chloride and to remove from the reaction zone metallic chlorides that are volatile at such temperatures.

However under these temperature conditions a greater amount of chlorine is required for chlorinating the titanium-containing materials and the necessity arises of neutralizing the chlorine fraction which is discharged together with the exhausted gas. Moreover the chlorinator is corroded under the temperature conditions at which calcium and magnesium chlorides volatilize, since materials are not known that withstand more than 1,000° C. temperatures under reducing conditions in contact with chlorine and with a fluidized bed of solid particles.

Titanium slags are produced by electric furnace treatments in iron extraction processes. Said materials contain titanium dioxide up to about 70% by weight, the iron oxide content being about 16% by weight. The materials contain also calcium or magnesium, these latter being used as scorification agents in the ore concentration.

Titanium slags are useful raw materials for preparing titanium dioxide by the sulphate process, but, as noted, agglomeration of the fluidized particles takes place in the chlorination method, caused by molten calcium and magnesium chlorides.

To obviate such a difficulty it has been suggested to remove the molten chlorides in such a way as to maintain their concentration, inside the chlorination zone, lower than about 5–6% by weight. According to this method the materials withdrawn from the chlorinator are lixiviated by means of water to separate the calcium or magnesium chloride and the lixiviation residue is recycled to the chlorination zone after drying. Difficulties still arise however since the molten calcium and magnesium chlorides easily accumulate at the bottom of the chlorinator, and the fluidization conditions may be compromised owing to incrustations on the feeding plate for the chlorine. Moreover the necessity of withdrawing the melted materials, lixiviating them with water and recycling the lixiviation residue after drying, makes the process uneconomic.

For the reasons given above the preparation of titanium tetrachloride by chlorinating ilmenite or titanium slags, has not been realized on an industrial scale.

It has now been found that the above drawbacks may be avoided or reduced.

According to this invention a hot combustion gas stream produced by burning coal and a stream of gaseous chlorine containing suspended titanium ore particles, are fed to a reaction zone, said zone being maintained under reducing conditions.

More particularly the combustion gas stream and the chlorine containing stream may be fed in opposite directions on a common axis, and brought into contact within the upper zone of an elongate, vertical reactor, reducing conditions being maintained therein by feeding carbon monoxide or finely powdered coal.

The reducing compounds may be fed in various ways; for example coal particles may be suspended into the gaseous chlorine stream together with the titanium ore particles, or they may be fed together with the combustion gas. Carbon monoxide may also be used, being obtained by burning coal with a restricted supply of oxygen.

The titanium ore chlorination is carried out at temperatures ranging between 900° and 1,200° C., the contact time being 1 to 10 seconds.

Under these conditions a complete titanium ore chlorination is realized and the chlorinated products, drawn from the reactor foot, are fed to a zone which is maintained at a relatively low temperature. In this zone dusts and slightly volatile chlorides are separated from the titanium tetrachloride, the latter being then recovered from the residual gas.

According to this invention the best conditions are realized by feeding to the chlorinator titanium ore particles having a size not higher than 62 microns and by feeding the theoretical quantity of chlorine for the production of metallic chlorides, or up to 10% higher than the theoretical quantity. For reducing the metallic oxides the theoretical quantity of the reducing compounds is fed to the chlorinator or up to 20% higher than the theoretical quantity.

According to a preferred embodiment of this invention the chlorination products, drawn from the reactor foot are mixed with liquid titanium tetrachloride in order to lower their temperature to about 150° C. By this treatment dusts are separated, as well as metallic chlorides which are not volatile at this temperature. From the residual gaseous stream the titanium tetrachloride is condensed together with a small amount of vanadium oxychloride. The condensation is preferably carried out in a scrubbing column by conducting the gaseous stream countercurrent to liquid titanium tetrachloride.

The exhausted gas, comprising carbon dioxide, carbon monoxide, hydrochloric acid and chlorine, is discharged after scrubbing by means of water or alkaline aqueous solution.

For a clearer understanding of the process, the invention will be now described in conjunction with the accompanying drawings.

In these drawings the chlorination reaction 1 consists of a zone 2 in which the coal is burned, a zone 3 in which the feeding streams are mixed and the chlorination reaction begins and a zone 4 in which the chlorination reaction is completed. More particularly in the zone 2 the powdered coal is burned by means of oxygen, air or air enriched with oxygen, the oxidative gas being fed by means of a burner 5.

A gaseous chlorine stream is fed through a line 6, said stream containing suspended titanium ore particles. The coal particles used as reducing agent may be fed together with a gaseous chlorine stream.

Mixing occurs in zone 3 of the reactor and the best conditions are realized by feeding the streams in opposite direction on a common axis, such as is represented by FIGS. 1 and 2.

Favorable results are also obtained by operating with angles of incidence of the streams lower than 180° for example by means of incidence angles ranging between 45° and 180°, such as it is represented by FIG. 3.

In the zone 4 of the reactor the chlorination reaction is completed. Removal of samples and measurement of temperatures are carried out by means of tubes 8.

By the method of this invention high reaction speeds are realized by converting the titanium ore into the titanium tetrachloride, the latter being completely recovered safely and controllably. Moreover the difficulties which made methods for chlorinating ilmenite or titanium slags by means of the fluidized bed technique objectionable do not arise. Rather, by the method of this invention molten chlorides, for example magnesium or calcium chloride as well as the ferrous chloride, are conveyed out of the reaction zone in the form of small drops, together with the reaction gas, without fouling or blocking the reaction. Partially chlorinated aluminium, silicon and zirconium oxides, as well as the small amounts of unreacted ore, unburned coal and coal ash present are likewise discharged from the reaction zone.

A further advantage of this invention lies in the possibility of utilizing a lean coal as reducing agent, especially a lean coal having a low content of volatile compounds, or a highly reactive metallurgical coke. The use of such inexpensive materials is possible since by the process of this invention the coal ash is easily discharged, in contrast to the processes known in the art in which rutile ore is chlorinated by means of the fluidized bed technique.

Another advantage lies in operating at temperatures at which ferrous chloride is formed, so that a smaller amount of chlorine is required.

The process of this invention has been described referring to the chlorination of ilmenite or titanium slags but obviously it is possible to use rutile as raw material as well as ilmenitic materials enriched with titanium dioxide up to about 95% by weight.

Ilmenitic titanium dioxide containing a rutile portion may also be chlorinated by means of the method of this invention. Said product is not a useful raw material for preparing titanium dioxide by the sulphate method, since the sulphuric acid reacts only with ilmenitic titanium dioxide.

The advantage of chlorinating rutile or materials having a high titanium dioxide content by means of the process of this invention lies in using inexpensive coal and in avoiding the difficulties in discharging the by-products from the reaction zone.

According to the present invention the zone of the reactor in which the coal is burned, may consist of a heatproof material under reducing conditions, pure alumina or mullite firebricks may be used. The zone of the reactor in which the chlorination occurs may consist of silica-alumina bricks having a high silica content.

The powdered coal may be burned by means of a coaxial tube burner. More particularly a first air stream may be fed through the inner tube together with the powdered coal (main stream), a second air stream (secondary stream) being fed through the hollow space between the two coaxial tubes. Oxygen or air enriched with oxygen may be used as oxidant agents in place of air.

Baffles may be applied at the end of the burner tubes for giving rise to a whirling motion in the gases, so that a stable, short flame is obtained near the burner in the burning zone. These are desirable conditions for obtaining uniform combustion without extinguishing the flame.

The coal combustion is influenced by the combustion time of the coal particles as well as by the flame speed. The size of the coal particles is therefore an important factor and, according to this invention, a finely powdered coal is preferably used, the size of said particles being smaller than 74 microns.

Moreover, for obtaining a high flame speed a main stream is fed having an oxidizing gas content three to six times lower than the amount required for the coal combustion, the remaining oxidizing gas being fed as a secondary stream.

In arranging the combustion device horizontally, as shown in FIG. 1, the main stream speed is preferably 18 m./sec. at least, the flame speed ranging between 3 and 18 m./sec. according to the coal reactivity.

In using a coal of low reactivity the best results are obtained by means of the arrangement shown in FIG. 2, since a lower feeding speed of the coal is required in arranging the combustion device vertically.

It is also convenient to preheat the oxidizer gas.

According to the present invention the chlorine stream containing the titanium ore particles suspended therein, is preferably fed at a speed of 18 m./sec. at least.

The coal particles may be fed by means of said stream to produce a reducing condition in the chlorination zone.

According to the present invention the size of the coal particles is preferably not higher than 62 microns, in order to obtain a low chlorination time.

The chlorination time is also influenced by the mixing speed of the streams inside the chlorination zone. To obtain a high mixing speed about the same momentum is imparted to the flue gas stream and to the chlorine containing stream. For this purpose it is possible to control the momentum of the flue gas stream by means of the width of the opening 7 between the combustion zone 2 and the mixing and reaction zone 3.

The chlorination reaction of the ilmenite ore may be represented by the following equation, when the coal is used as reducing agent.

$$2FeTiO_3 + 3C + 6Cl_2 \rightarrow 2FeCl_2 + 2TiCl_4 + 3CO_2$$

Other oxides contained in the core are likewise chlorinated.

By using carbon monoxide as reducing agent, the titanium tetrachloride is produced according to the equation $$FeTiO_3 + 3CO + 3Cl_2 \rightarrow FeCl_2 + TiCl_4 + 3CO_2$$

Higher reaction speeds are obtained by using carbon monoxide as the reducing agent. Therefore according to a preferred embodiment of this invention the coal is burned, in the combustion zone, in default of oxygen, so that a high amount of carbon monoxide is produced, the powdered coal being fed in such an amount as to complete the reduction of the metallic oxides.

By means of this invention therefore the titanium tetrachloride is produced by means of a simple method, by chlorinating inexpensive raw materials such as ilmenite or titanium slags.

Moreover by purifying such raw titanium tetrachloride according to the purification methods known in the art, a highly pure titanium tetrachloride is obtained, which may be converted into a high grade pigment titanium dioxide.

EXAMPLE 1

Titanium tetrachloride is produced by chlorinating ilmenite by means of gaseous chlorine in a pilot plant.

Referring to FIG. 1 the pilot plant comprises the combustion chamber 2 of 1.2 m. internal diameter, the length being 4 m. The combustion chamber is lined with pure alumina firebricks. Powdered coal is burned by means of the burner 5 and in particular a double coaxial tube burner is used. Baffles are applied at the end of the burner tubes, and the opening 7, at the end of the combustion chamber 2 is of 0.4 m. internal diameter.

A chlorine stream, containing suspended ilmenite and coal particles, is fed through the tube 6, the latter having 0.09 m. internal diameter.

Referring to FIG. 1 the zones 3 and 4 are 2 m. internal diameter, the total height being 6 m. The zones of the chlorinator in which the chlorination occurs, are lined with silica-alumina firebricks having a silica content of about 71%.

The powdered coal is fed by means of the burner 5 at the rate of 105 kg./hr. together with preheated air (250 kg./hr.) as a main stream. The size of the coal particles is smaller than 53 microns and the air stream is preheated to about 50° C. Preheated air is fed by means of the burner 5, at the rate of 970 kg./hr. as a secondary stream, said stream being preheated to 450° C., and under these conditions the temperature of the flue gas is about 1550° C.

The chlorine is fed to the chlorinator through the line 6 at the rate of 1020 kg./hr. Powdered coal is fed at the rate of 90 kg./hr. together with the chlorine. Likewise powdered ilmenite is fed at the rate of 680 kg./hr. The size of the ilmenite particles is smaller than 53 microns, the coal being like the combustion coal.

The ilmenite ore chlorinated has the following composition:

| | Percent |
|---|---|
| $TiO_2$ | 54.8 |
| $Fe_2O_3$ | 1.8 |
| $FeO$ | 22.1 |
| $MnO$ | 1.4 |
| $MgO$ | 0.3 |
| $Al_2O_3$ | 0.9 |
| $CaO$ | 0.1 |
| $SiO_2$ | 0.7 |
| $V_2O_5$ | 0.1 |
| $Cr_2O_3$ | 0.1 |
| $P_2O_5$ | 0.1 |
| $H_2O$ | 0.2 |
| Other | 1.2 |

Under these conditions the chlorination temperature is about 1020° C. in the zone 3 and the chlorine is entirely converted into metallic chlorides.

The chlorination products are cooled at 150° C. by means of cold liquid titanium tetrachloride into a dust chamber, to effect separation of solid metal chlorides, such as the chlorides of the metals iron, magnesium and calcium, as well as of the unreacted coal and of the small amount of unreacted titanium ore. The gaseous titanium tetrachloride is then recovered by means of a scrubbing column by treating counter-current to cold liquid titanium tetrachloride. The small amount of titanium tetrachloride contained in the residual gas is recovered by cooling by means of a brine cooler, and the exhausted gases are discharged after scrubbing with water.

Under these conditions the titanium tetrachloride is produced at the rate of 910 kg./hr., 555 kg./hr. of the solid products being separated by the dust chamber.

When the run was stopped, after 20 days, no deposits were observed in the chlorinator.

EXAMPLE 2

The same procedure is followed and the same equipment used in the Example 1, but a greater amount of coal is fed to the burner, so that a combustion in a deficiency of oxygen is achieved in the combustion zone.

More particularly, referring to FIG. 1, 150 kg./hr. of the powdered coal and 250 kg./hr. of air are fed by means of the burner as a main stream. The size of the coal particles is smaller than 53 microns, the air being preheated to a temperature of 50° C.; 950 kg./hr. of air are fed by means of the burner as a secondary stream. Said stream is preheated to a temperature of 450° C.

The chlorine is fed through the line 6 at a rate of 1020 kg./hr., together with the powdered coal (90 kg./hr.) and the ilmenite (680 kg./hr.). The results are similar to those of the first example, but the reaction time is 30% lower.

EXAMPLE 3

The same procedure is followed and the same equipment used as in the Example 1 but air, enriched with oxygen is fed to the combustion zone.

More particularly an enriched air is used having an oxygen content of 40% by volume. Referring to FIG. 1 the enriched air is fed by means of the burner at the rate of 108 kg./hr. as a main stream together with the powdered coal (105 kg./hr.). The size of the coal particles is smaller than 53 microns, the enriched air being preheated to a temperature of 50° C.; 462 kg./hr. of the enriched air are fed by means of the burner as as secondary stream, which is preheated to 450° C.

The chlorine is fed through the line 6 at a rate of 1020 kg./hr. together with the powdered coal (90 kg./hr.) and the ilmenite (680 kg./hr.).

The results are similar to those of the first example, but the reaction occurs in the upper zone of the chlorination chamber.

EXAMPLE 4

The same procedure is followed and the same equipment used as in the Example 1, but a titanium slag having the following composition is chlorinated:

| | Percent |
|---|---|
| $TiO_2$ | 70.9 |
| $FeO$ | 16.1 |
| $MnO$ | 1.5 |
| $MgO$ | 5.6 |
| $CaO$ | 0.2 |
| $Al_2O_3$ | 2.2 |
| $SiO_2$ | 1.8 |
| $V_2O_5$ | 0.2 |
| $Cr_2O_3$ | 0.2 |
| $H_2O$ | 0.2 |
| Other | 1.1 |

Referring to FIG. 1 a main stream is fed by means of the burner, said steam comprising powdered coal (105 kg./hr.) and an air stream preheated to 50° C. (250 kg./hr.); 970 kg./hr. of air, preheated to 450° C., are fed as secondary stream.

700 kg./hr. of the titanium slag is fed through the line 6 together with powdered coal (95 kg./hr.), said products being suspended in a gaseous chlorine stream, the chlorine being fed at a rate of 1080 kg./hr. The size of the coal and of the titanium slag particles is smaller than 53 microns.

Under these conditions the chlorine is fully converted into the metallic chlorides. Moreover the titanium tetrachloride is produced at a rate of 1180 kg./hr., 320 kg./hr. of solid products being separated by means of the dust chamber. Said solid products comprise iron chloride and magnesium chloride as well as a small amount of unreacted titanium slags.

EXAMPLE 5

The raw titanium tetrachloride, produced according to the former examples, is purified for the purpose of producing high grade titanium tetrachloride.

The solid products content in said raw titanium tetrachloride is about 1% by weight, the vanadium oxychloride content being about 0.2% by weight.

The solid products are first separated from the liquid phase and then powdered copper is added in amount of about 2% by weight. The mixture is heated to boiling temperature and is maintained under such temperature conditions for one hour. By fractionation, a titanium tetrachloride is obtained having a vanadium content lower than 2 p.p.m.

We claim:

1. A method for preparing titanium tetrachloride by the chlorination of titanium-containing material with gaseous chlorine in a vertical, elongated reaction zone, said method comprising:

(1) combusting coal in a combustion zone outside of said reaction zone to produce a first gas stream comprising hot combustion gases;
   (2) feeding to the upper portion of said reaction zone, from opposite directions, said first gas stream and a second gas stream comprising gaseous chlorine having particles of said titanium-containing material suspended therein, said second gas stream being fed to said upper portion at a velocity of at least 18 meters per second wherein the momentum of said second gas stream and the momentum of said first gas stream is substantially equal, wherein the angle formed by said first and said second gas streams at the point of contact thereof is about 180°, wherein said titanium-containing material is selected from the group consisting of powdered ilmenite and titanium slag and wherein the size of said particles is not more than 62 microns;
   (3) contacting said first and said second gas streams in said upper portion and chlorinating said titanium-containing material in a chlorination zone below said upper portion at a temperature of from 900 to 1200° C. and at a contact time of from 1 to 10 seconds;
   (4) maintaining reducing conditions in said chlorination zone by means of a reducing agent selected from the group consisting of powdered coal and partial combustion products thereof, said reducing agent being fed to said reaction zone in said first gas stream or in said second gas stream; and
   (5) withdrawing the chlorination products from the bottom of said reaction zone and recovering titanium tetrachloride from said chlorination products.

2. The method of claim 1 wherein the amount of gaseous chlorine fed to said reaction zone is from the theoretical amount to 10% higher than the theoretical amount necessary to chlorinate the metallic oxides fed to said reaction zone.

3. The method of claim 1 wherein the amount of said reducing agent fed to said reaction zone is from the theoretical amount to 20% higher than the theoretical amount necessary to totally reduce the metallic oxides fed to the reaction zone.

4. The method of claim 1 wherein the reducing agent is carbon monoxide produced by combusting coal in the absence of oxygen.

5. The method of claim 1 wherein said chlorination products withdrawn from the bottom of said reaction zone are cooled to a temperature of about 150° C. by contacting said chlorination products with cold liquid titanium tetrachloride to remove dust and non-volatile metallic chlorides from said chlorination products and wherein the titanium tetrachloride product is recovered from the resulting gas stream by scrubbing said gas stream with a countercurrent stream of cold liquid titanium tetrachloride, the product titanium tetrachloride being condensed during said scrubbing.

6. The method of claim 1 wherein said reducing agent is selected from the group consisting of lean coal having a low content of volatile compounds and a highly reactive metallurgical coke.

7. The method of claim 1 wherein the coal combusted in said step (1) is a finely-powdered coal having a particle size smaller than 74 microns.

8. The method of claim 1 wherein said first gas stream is fed to said upper portion at a velocity of at least 18 meters per second.

References Cited
UNITED STATES PATENTS

| | | | |
|---|---|---|---|
| 2,245,358 | 6/1941 | Pechukas | 423—77 |
| 2,668,424 | 2/1954 | Mueller | 423—77 X |
| 2,985,507 | 5/1961 | Wienert | 423—77 |
| 3,050,362 | 8/1962 | Oppegaard et al. | 423—77 |
| 3,149,911 | 9/1964 | Fornasieri et al. | 423—78 |
| 3,533,733 | 10/1970 | Clark et al. | 423—77 |

EDWARD STERN, Primary Examiner

U.S. Cl. X.R.
423—78, 79, 492